United States Patent
Hammond et al.

(10) Patent No.: US 7,395,415 B2
(45) Date of Patent: Jul. 1, 2008

(54) METHOD AND APPARATUS TO PROVIDE A SOURCE OPERAND FOR AN INSTRUCTION IN A PROCESSOR

(75) Inventors: Gary Hammond, Fort Collins, CO (US); Carl Scafidi, Fort Collins, CO (US); John Crawford, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 10/953,760

(22) Filed: Sep. 30, 2004

(65) Prior Publication Data
US 2006/0095728 A1     May 4, 2006

(51) Int. Cl.
*G06F 9/38*     (2006.01)

(52) U.S. Cl. .................................................. 712/218
(58) Field of Classification Search .................. 712/218
See application file for complete search history.

(56) References Cited

U.S. PATENT DOCUMENTS

| 5,555,432 A * | 9/1996 | Hinton et al. ................. 712/23 |
| 5,651,125 A * | 7/1997 | Witt et al. .................... 712/218 |
| 2003/0200422 A1* | 10/2003 | Hironaka et al. ............ 712/215 |

* cited by examiner

*Primary Examiner*—William M Treat
(74) *Attorney, Agent, or Firm*—Kenyon & Kenyon LLP

(57) ABSTRACT

A method and apparatus for providing a source operand for an instruction to be executed in a processor. Some embodiments may include a register file unit that has registers and a scheduler to schedule instructions. In some embodiments, the scheduler is to asynchronously receive an instruction and a source operand for that instruction, the source operand being received from the register file unit.

17 Claims, 4 Drawing Sheets

METHOD AND APPARATUS TO PROVIDE A SOURCE OPERAND FOR AN INSTRUCTION IN A PROCESSOR

FIELD OF THE INVENTION

Embodiments of the present invention relate in general to instruction pipelines in computer processors.

BACKGROUND

A processor in a computer system typically carries out the execution of instructions in a series of stages, which may be referred to as a pipeline. Each of these stages may be performed by a different section of the processor. As an example, an instruction may be decoded by a decoder and, at a later time, the decoded instruction(s) executed by a functional unit. In an "out-of-order" architecture, instructions may be executed by an execution unit in a different order than is specified by the program from which they are derived. In such a case, the instructions may be dispatched by a dispatcher into a scheduler, and the scheduler may determine the order in which the instructions are issued to a functional unit that executes the instructions.

The instructions that a processor performs typically use registers to store data. An instruction may have one or more source operands, which may be stored in register(s), and an instruction may produce a result, which may also be stored in a register. An instruction may be said to use a register if a source operand is stored in that register (i.e., it reads from the register) or a result is stored in that register (i.e., it writes to the register). For example, for a given instruction the processor may read a data operand out of register R0, read a data operand out of register R3, add these data operands, and then store the results back into register R4. Some prior architectures may have a register cache, and in such architectures source operands may be obtained from the register cache or, if a cache miss, from the register file unit. In prior architectures, every instruction in the pipeline must flow through the register file unit (or associated register cache). For example, some prior out-of-order architectures have the register file unit either in the main pipeline after the schedulers, in which case the register file unit may be accessed as instructions are scheduled out of the scheduler to functional units, or may have the register file unit in the main pipeline before the schedulers, in which case the register file unit may be accessed as instructions enter the scheduler.

DETAILED DESCRIPTION

Embodiments of the present invention relate to a method and apparatus for providing a source operand for an instruction in a processor pipeline. In some embodiments, a processor has a register file unit that is implemented in parallel to the functional units, with regard to providing data operands for instructions in a scheduler, and may be considered as providing data operands as if it were a function unit. In some embodiments, an instruction that has a source operand to be read from a register may be dispatched without sending a read request to that register if there is a producer instruction for this source operand in-flight and, even if not, may be dispatched prior to the availability of the results of a read request to that register. According to some embodiments, multiple reads to the same physical register by multiple instructions may be collapsed into a single register file read, and thus the one register file read may sink its data into 1 to n waiting instructions within the schedulers. In some embodiments, the processor may be designed to tolerate register file accesses that have variable latency. It will be appreciated that modifications and variations of the examples described herein are covered by the teachings provided below and are within the purview of the appended claims.

Figure 1:
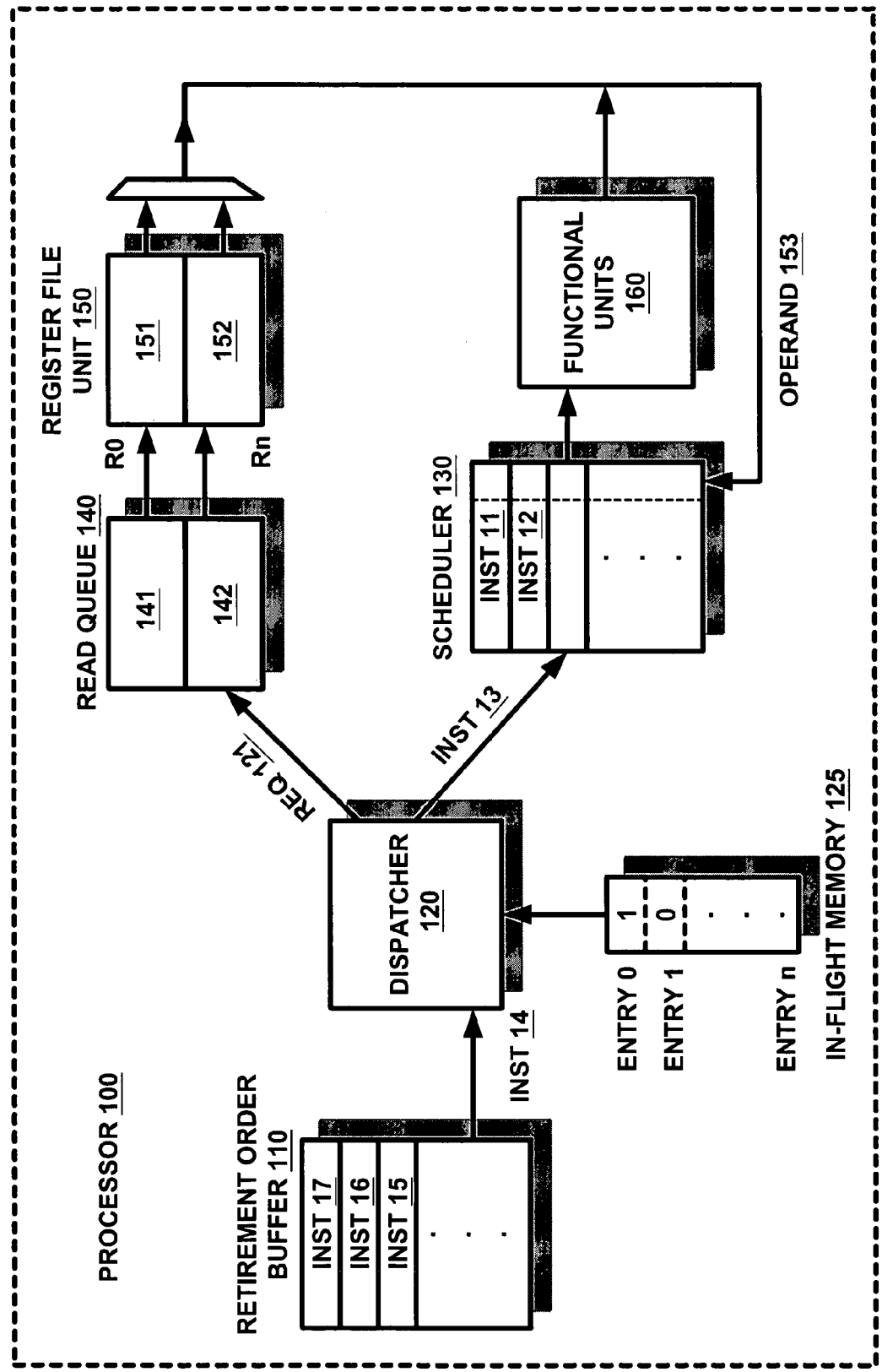
FIG. 1 is a simplified block diagram of a processor that provides source operands to a scheduler in accordance with an embodiment of the present invention.

FIG. 1 is a simplified block diagram of a processor that provides source operands to a scheduler in accordance with an embodiment of the present invention. FIG. 1 shows a processor 100 that includes a retirement order buffer 110, dispatcher 120, in-flight memory 125, scheduler 130, read queue 140, register file unit 150, and functional units 160. Processor 100 may be any type of processor for a computer system, such as for example a Pentium® class microprocessor from Intel Corp. of Santa Clara, Calif. The units shown in FIG. 1 may be implement as, for example, hardware, firmware or some combination of these. While FIG. 1 shows an instruction pipeline for processor 100, in other embodiments the instruction pipeline may contain more units, different units, and/or additional units.

As shown in FIG. 1, retirement order buffer 110 stores a plurality of instructions, such as instructions 15-17. These instructions may be, for example, micro-instructions that were decoded from a set of program instructions to be executed by processor 100, for example according to known instruction processing techniques. These instructions may also be macro-instructions, some combination of micro and macro instructions, etc. For example, instruction 15 may be an instruction to "ADD R0=R3, R4", which may require an addition of the data operand stored in register 0 to the data operand stored in register 3, with the result stored in register 4. Of course, retirement order buffer 110 may store more than three instructions to be executed. In the embodiment shown, the instructions are not stored in retirement order buffer 110 with any data operands to be used by the instruction, the data being provided by units further in the pipeline, as discussed below.

Retirement order buffer 110 is coupled to dispatcher 120 and may provide instructions to dispatcher 120. Two items may be referred to herein as "coupled" if they are directly or indirectly connected. In some embodiments, and as shown in FIG. 1, dispatcher 120 is coupled to read queue 140, which is in turn is coupled to register file unit 150. In the embodiment shown in FIG. 1, register file unit 150 contains a first bank of registers 151 and a second bank of registers 152, and read queue 140 correspondingly contains a first bank of memory cells 141 and a second bank of memory cells 142. For example, the queues may be banked into even and odd register banks. In other embodiments, register file unit 150 and read queue 140 may not be banked or may contain a different number of banks. In some embodiments, the processor may include a 2-bank register file unit with two read ports per bank, implemented with simple SRAM cells, for a total of up to 4 read results per cycle. In the embodiment shown, dispatcher 120 may send read queue 140 a request that a register in register file unit 150 be read to provide a data operand that is to be used by an instruction, and read queue 140 may buffer such request and pass it on to the appropriate register in register file unit 150. For example, if dispatcher 120 is dispatching an instruction 13 which is to read a data operand from a register R3, dispatcher 120 may send a request 121 to read queue 140 that requests a read from register R3. In some embodiments, the read queues may be bypassed if there are no waiting requests. Read queue 140 may be any type of memory device that implements queues. The read queues may be designed, for example, to absorb the worst-case read request rate, and may be drained at the rate supported by the register file unit's read portage (e.g., through the available register read ports in the corresponding banks). In some embodiments, the register read queues may smooth the flow rate of register read requests towards a steady state level.

Register file unit 150 contains a group of registers R0 to Rn that may be used to store data operands that are used by instructions being executed by processor 100, as is well known. Register file unit 150 may be any type of memory unit, such as a group of static random access memory (SRAM) cells, a group of dynamic random access memory (DRAM), or traditional register cells. Register file unit 150 may contain any number of registers, such as for example five hundred and twelve 82-bit registers. In some embodiments, a sea of physical registers can may be implemented using, for example, high-density, low-power SRAM cells (such as, for example, in a data cache). Architectural and speculative register state may be co-mingled in the same physical register file. In such embodiments, architectural and speculative register renaming may adjust the rename pointers as instructions are retired to preserve the correct architectural state. In some embodiments, the registers in the register file unit have a low number of ports. In an embodiment, for example, the registers may be implemented as a register file unit with 4 total read ports and 2 total write ports, split into 2 banks, using 2 read and 1 write SRAM cache cells on a 4-wide dispatch machine. For example, the register file unit may have 512 registers and 4 output ports.

Dispatcher 120 is coupled to scheduler 130, which is in turn coupled to functional units 160. In other embodiments, the processor may have multiple schedulers, such as one for each functional unit or for a cluster of functional units. Dispatcher 120 may dispatch an instruction, such as instruction 13, into scheduler 130. Scheduler 130 may store a number of instructions, such as instructions 11-12, that are waiting to be scheduled for execution by one of the functional units. Scheduler 130 may store an instruction without the operand that is to be used by the instruction (as suggested by the empty column shown in scheduler 130). In some embodiments, an instruction may start to have a status of "in-flight" once dispatched into scheduler 130 and may continue to have an in-flight status until a data result is delivered for that register (e.g., by the register file unit or a functional unit, as discussed below) and is no longer available (e.g., from the functional unit or a bypass network). Functional units 160 may be one or more units that perform instructions, such as an arithmetic logic unit, a floating point execution unit, an integer execution unit, a branch execution unit, etc. When an instruction is to be executed, it is forwarded to the appropriate one of functional units 160, which functional unit executes the instruction.

Scheduler 130 may be an out-of-order scheduler in that instructions may be executed in a different order than they appear. For example, instruction 12 may be executed before instruction 11 even though instruction 11 was dispatched to scheduler 130 before instruction 12. Scheduler 130 may schedule instructions by implementing any scheduling algorithm.

As shown in FIG. 1, output ports of the register file unit 150 are coupled (here, through a multiplexer) to an input port(s) of scheduler 130. In addition, functional units 160 have output ports that are coupled to an input port(s) of scheduler 130. According to some embodiments, instructions that specify a data operand to be read from a register may be dispatched into scheduler 130 without the source operand that is specified and before the operand is available. In some embodiments, scheduler 130 stores an instruction with a source operand that specifies a register and schedules the stored instruction based on the arrival at the scheduler of the source operand for that instruction. In some embodiments, the source operand for an instruction is provided to the scheduler asynchronously from dispatching the new instruction to the scheduler, which means that there may be no correlation in time between when the instruction is dispatched into the scheduler and when the source operand arrives at the scheduler. Thus, the arrival at the scheduler of the instruction may be decoupled from the arrival at the scheduler of the data operand for that instruction. As discussed in more detail below with reference to FIG. 2, the source operand to be used by an instruction waiting in the scheduler may be provided to the scheduler from register file 150 or functional units 160. For example, assuming that instruction 12 is an instruction that is to use a source operand 153 to be read from a register, and that instruction 12 was dispatched to scheduler 130 before that source operand was available, then the source operand 153 may be provided to scheduler 130 for use by waiting instruction 12 either from register file 150 or functional units 160.

FIG. 1 also shows an in-flight memory 125 that is coupled to dispatcher 120. As shown, in-flight memory 125 contains a plurality of one-bit memory locations, which are labeled entry 0 to n for illustration purposes in FIG. 1. In the embodiment shown, in-flight memory 125 stores an array or table which indicate whether a register in the register file unit is to be used by an instruction that is in-flight. In other embodiments, other elements/mechanisms may be used to indicate whether a register in the register file unit is to be used by an instruction that is in-flight, such as a content addressable memory, assortment of comparators, etc. In the example shown in FIG. 1, entry number 0 in in-flight memory 125 contains the value "1", which may indicate that register 0 is to be used by an instruction that is in-flight, and entry number 1 contains the value "0", which may indicate that there are no instructions in-flight that are to use register 1. In some embodiments, such an in-flight table may be updated to reflect all producer instructions that have been dispatched to the scheduler(s). In some embodiments, in-flight status may also be set for register read requests, in that the register file unit is a producer for the physical register. As discussed below, dispatcher 120 may use the information stored in in-flight memory 125 to determine whether to generate a request to read queue 140 for an instruction to be dispatched (i.e., to generate a request to read data from a register that is specified as the location of a source operand for the instruction). If such a request is generated, dispatcher 120 may dispatch the instruction to scheduler 130 prior to the completion of the read request. In some embodiments, cells in in-flight memory 125 may be fully ported or partially ported.

Figure 2:
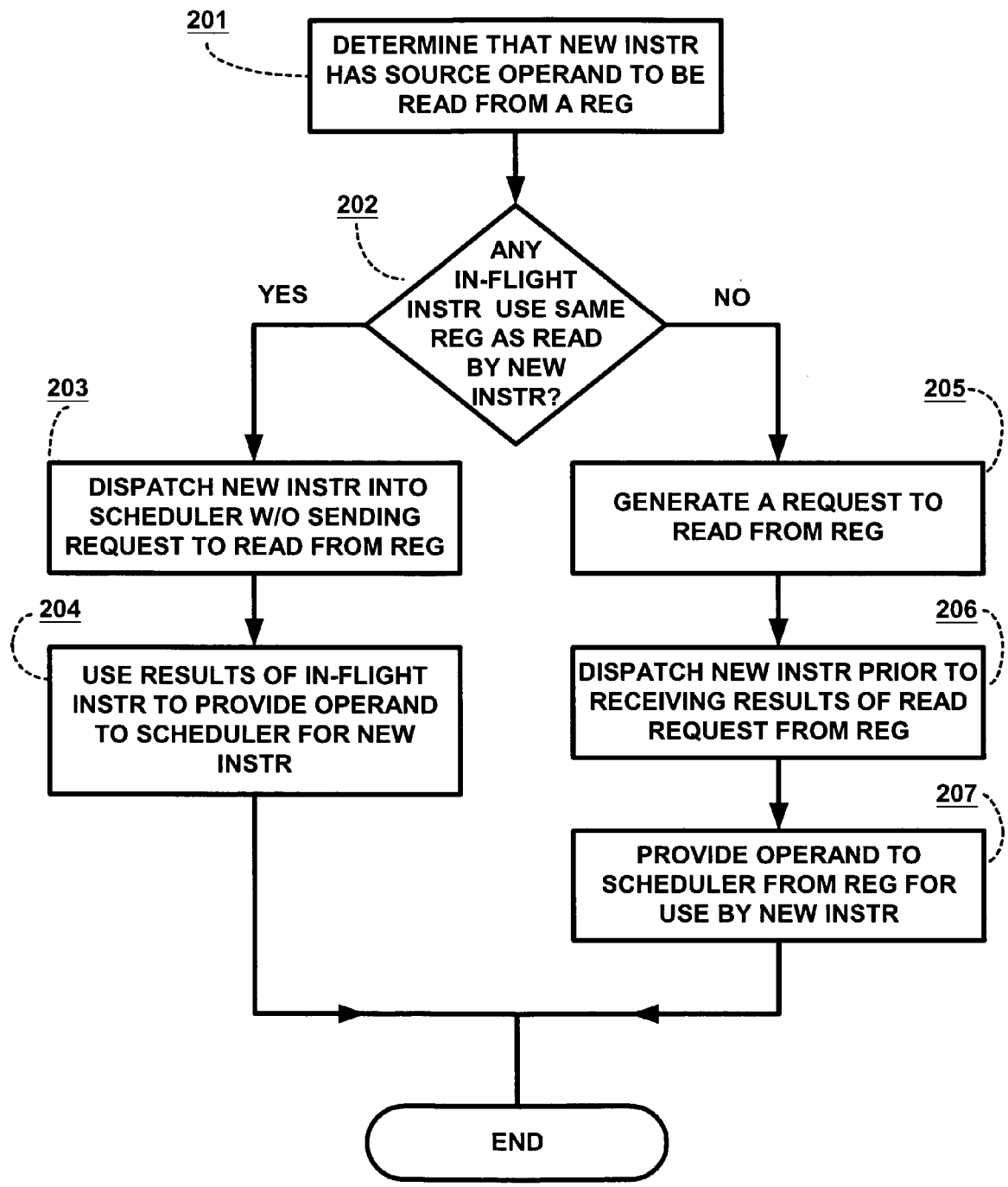
FIG. 2 is a simplified flow diagram of a method of dispatching instructions into a scheduler and requesting reads from registers in accordance with an embodiment of the present invention.

FIG. 2 is a simplified flow diagram of a method of dispatching instructions into a scheduler and requesting reads from registers in accordance with an embodiment of the present invention. This method will be discussed with reference to the apparatus shown in FIG. 1, but it may also be performed using any other appropriate apparatus. Instructions may flow through the pipeline of a processor, such as processor 100, and for example may be stored in retirement order buffer 110. A new instruction may be examined and it may be determined that the instruction has a source operand to be read from a register (201). For example, dispatcher 120 may obtain an instruction from the retirement order buffer and determine that the instruction is an "ADD R0=R3, R4" instruction, in which case source operands must be read from register 0 and register 3. In another example, if the new instruction does not have a source operand that reads from a register, then the new instruction may simply be forwarded to the scheduler for scheduling as would be understood by a person of skill in the art.

If the new instruction does have a source operand that reads from a register, then according to the embodiment shown it is determined whether any in-flight instructions use the same register(s) as are to be read from by the new instruction (202). In some embodiments, an in-flight instruction is considered to use the same register as is read from by the new instruction if the in-flight instruction reads from that same register or writes to that same register. In some embodiments, determining whether an in-flight instruction is to use the same register as is read from by the new instruction comprises checking an array in a memory to determine whether any instructions in-flight are to be read from the same register as the new instruction or written to that same register. For example, if dispatcher 120 receives an instruction 14 that is an "ADD R0=R3, R4" instruction, which reads from register 0 and register 3, dispatcher 120 may check in-flight memory 125 to see if any in-flight instructions are to use register 0 and register 3. In the example shown in FIG. 1, entry 0 in in-flight memory 125 (which corresponds to register 0) contains the value "1", which may indicate that an in-flight instruction (e.g., instruction 11) is to use register 0.

If an in-flight instruction uses the same register as is to be read from by the new instruction, then the new instruction may be dispatched into the scheduler without sending the register a request to read the source operand (203). In this case, the result operand from the in-flight instruction may be provided to the scheduler for use as the source operand by the new instruction (204). In the example discussed above, if instruction 14 is to use a source operand that is stored in register 0, but instruction 11 is in-flight and is to read from or write to register 0, then instruction 14 may be dispatched into scheduler 130 without sending a read request to register file unit 150 to read register 0. If instruction 11 simply reads from register 0, the operand which is read from register 0 (such as operand 153 in FIG. 1) may be provided from an output port of the register to an input of the scheduler 130, at which point the operand may be stored in scheduler 130 for future use by instruction 14 when that instruction is executed. If instruction 11 changes the value of register 0 (e.g., it writes a result to register 0), then the result that is produced by functional unit 160 when it executes instruction 11 (such as operand 153 in FIG. 1) may be provided from an output port of the functional unit to an input of the scheduler 130 for future use by instruction 14 as just discussed. This assumes, of course, that the new instruction will not be scheduled for execution before the in-flight instruction on which it depends. According to some embodiments, thus, read requests are not generated if a producer instruction is in-flight, where a producer instruction may be one that is performed by a functional unit or the register file unit.

If there are no in-flight instructions that use the same register as is to be read from by the new instruction, then a request may be generated to read from the register that contains the source operand for the new instruction (205). In the example above, if in-flight memory 125 indicates that there are no in-flight instructions that use register 0, then dispatcher 120 may generate a request 121 to read register 0. In some embodiments, generating a request to read the register comprises sending a read queue for that resister (e.g., read queue 140) a request to read the source operand from the register. Thus, according to some embodiments, the dispatcher may continue to dispatch instructions into an instruction scheduler even if there are not enough ports available in the register file to receive the read request. In the embodiment shown in FIG. 2, the new instruction is dispatched into the scheduler prior to receiving the results of the generated read request (206). In the example above, instruction 14 may be dispatched into scheduler 130 even though register 0 has not yet been read in response to read request 121. As shown in FIG. 2, the source operand for the new instruction may be provided to the scheduler for use by the new instruction from the register when the read request is completed (207). For example, instruction 12 may be waiting in scheduler 130 for operand 153 to be provided from register 0 to scheduler 130 in response to read request 121.

In some embodiments, register file results may be loaded into the scheduler using content addressable memory (CAM), as may be used for the processors functional units. In some embodiments, the source operand for the new instruction may be provided to an input port of the scheduler from either an output port of the register or from an output port of a functional unit, wherein the register file unit and the functional unit share the scheduler input port. In some embodiments, instructions waiting in the scheduler may be insensitive to when a register file data value arrives. Thus, the scheduler may capture source operand data as functional units and the register file unit produce their results. When the scheduler has all required source operand data values for a specific instruction, the scheduler may issues the instruction to the correct functional unit. In some embodiments, subsequent instructions not needing a register read value may enter the scheduler immediately to be scheduled around instructions that need a register file read. Thus, the source operand may be provided to the scheduler asynchronously from dispatching of the new instruction to the scheduler, and the scheduler may wait for the source operand to be provided to the scheduler before scheduling the new instruction for execution.

Figure 3:
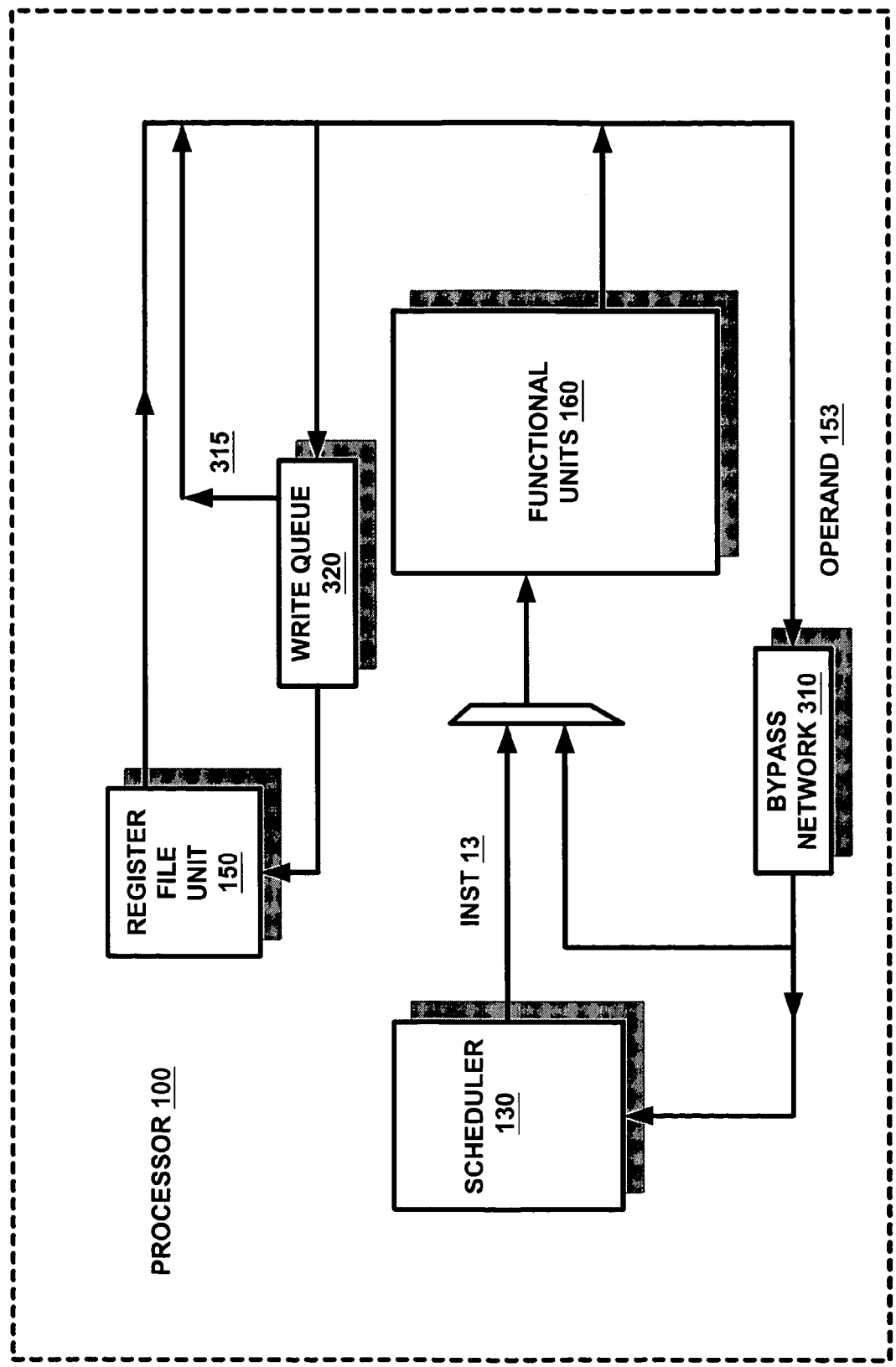
FIG. 3 is a simplified block diagram that shows details of a processor with a register file unit and functional units coupled to a scheduler in accordance with a further embodiment of the present invention.

FIG. 3 is a simplified block diagram that shows details of a processor with a register file unit and functional units coupled to a scheduler in accordance with a further embodiment of the present invention. FIG. 3 shows processor 100 with some of the components shown in FIG. 1. In particular, FIG. 3 shows the scheduler 130, register file unit 150, and functional units 160 of FIG. 1. In the embodiment shown in FIG. 3, processor 100 also has a bypass network 310 is coupled to scheduler 130, register file unit 150, and functional units 160. In particular, an output port(s) of bypass network 310 is coupled to an input port(s) of scheduler 130 and is coupled (here, through a multiplexer) to input port(s) of functional units 160. In addition, output port(s) of register file unit 150 and of functional units 160 are coupled to input port(s) of bypass network 310. In some embodiments, output data from register file unit 150 or functional units 160 may be forwarded to scheduler 130 or functional units 160 for use by future instructions. In some embodiments, bypass network 310 may contain buffer(s) to temporarily store data operands. Of course, an output port from bypass network 310 may be coupled (through register file unit ports) to each of the registers in register file unit 150 and to a set of the functional units in functional units 160. In some embodiments, bypass network may contain queueing or buffering that temporarily stores the results after they have been produced, and in some embodiments an instruction may be considered to have a status of in-flight as long as the results produced by that instruction are still available in the bypass network. In some embodiments, the use of such buffering may result in less read traffic from the register file unit.

In the embodiment shown in FIG. 3, processor 100 also has a write queue 320 that is coupled to register file unit 150, functional units 160, and bypass network 310. In particular, write queue 320 may have an output port coupled to an input port of register file unit 150, an output port coupled through a bypass network 315 to bypass network 310, and an input port coupled to output ports of register file unit 150 and functional units 160. According to some embodiments, register writes may be buffered in write queue 320 and written into the register file unit in the background. In some embodiments, if an instruction is to read from a register, and a write is pending for that register in write queue 320, the data may be provided from the write queue to the scheduler 130 via bypass network 315. As with register file unit 150, in some embodiments write queue 320 may have multiple banks. Of course, output ports from write queue 320 may be coupled to each of the registers in register file unit 150. In some embodiments, where there is a register file write-to-read conflict, register values not yet written may be bypassed from the write queues into the register read data path.

Figure 4:
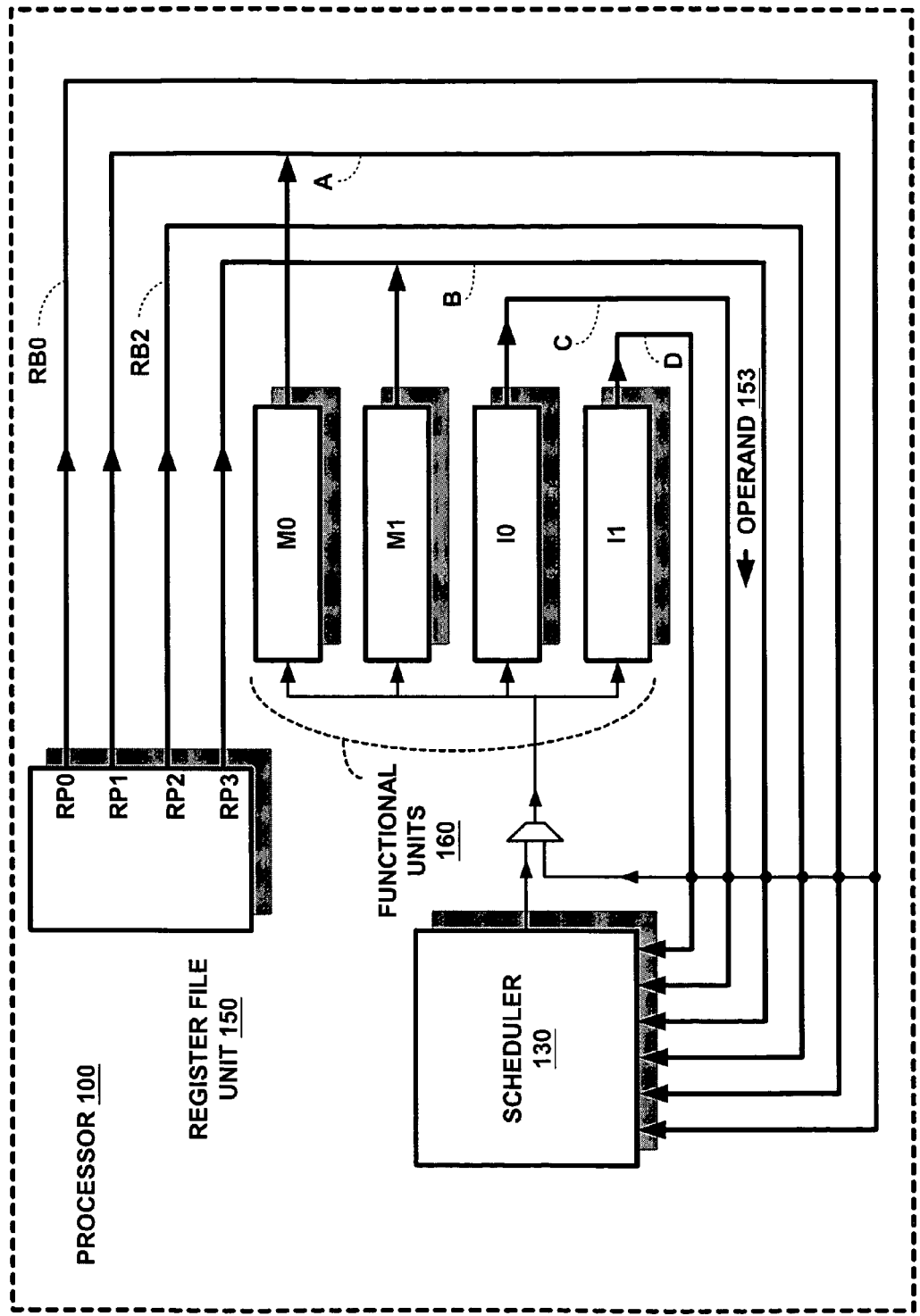
FIG. 4 is a simplified block diagram that shows details of a processor with a register file unit and functional units coupled to a scheduler in accordance with a further embodiment of the present invention.

FIG. 4 is a simplified block diagram that shows details of a processor with a register file unit and functional units coupled to a scheduler in accordance with a further embodiment of the present invention. In some processors, busses and bypass muxes may be used to deliver register data to the functional units/schedulers/bypass network. According to embodiments of the processor described above, additional CAM ports to the execution unit scheduler may be used to accommodate providing data from the register file unit to the scheduler. In some embodiments, and as shown in FIG. 4, the functional unit result busses and CAM ports of a select number of execution units may be overloaded/shared with the register file read results busses.

FIG. 4 shows processor 100 with some of the components shown in FIG. 1. In particular, FIG. 4 shows the scheduler 130, register file unit 150, and functional units 160 of FIG. 1. In the embodiment shown in FIG. 4, register file unit 150 comprises four read ports RP0 to RP3, and functional units 160 comprise two memory functional units (M0 and M1) and two integer functional units (I0 and I1). Of course, in other embodiments the register file unit may contain more or less read ports and there may be more, less, and/or different functional units. As shown in FIG. 4, scheduler 130 has a plurality of input ports. As shown, register file unit read port RP0 may be coupled over a bus RB0 to one input port of scheduler 130. In addition, register file unit read port RP1 from the register file unit and an output port of functional unit M0 may be both coupled over a shared bus, which is labeled A in FIG. 4, to a second (shared) input port in scheduler 130. Register file unit read port RP2 may be coupled over a bus RB2 to a third input port in scheduler 130. Register file unit read port RP3 and an output port of functional unit M1 may be both coupled over a shared bus, which is labeled B in FIG. 4, to a fourth (shared) input port in scheduler 130. Finally, an output port of integer functional unit 0 may be coupled over a bus C to a fifth input port in scheduler 130, and an output port of integer functional unit 1 may be coupled over a bus D to a sixth input port in scheduler 130.

Thus, in some embodiments a bus that is coupled to the scheduler may be shared by a functional unit and a register, and/or a CAM input port of the scheduler may be shared by a functional unit and a register. In some embodiments, overloading result busses between the functional unit and register file unit may minimize the impact of the register file unit on the bypass network and scheduler(s). As shown in FIG. 4, each of the busses from the register file unit and functional units may provide an operand, such as operand 153, to the scheduler 130, for example as described above with regard to FIG. 1-3.

In some embodiments, the peak load times for functional unit results and register file results may be orthogonal. During steady state execution, for example, functional units may be providing new results, and most instructions may obtain their needed source operand results from in-flight instructions (e.g., via the bypass network). In this case, required register file reads may be infrequent. Conversely, after a restart the functional units may go idle and not place data on the result busses, while register file reads may peak to service new instructions entering the machine. This orthogonality may be considered in sharing of the result busses and CAM ports.

The table below shows the result busses for all of the execution units in an example processor that is similar to the one shown in FIG. 4. While the processor in FIG. 4 has two memory execution units (M0 and M1) and two integer execution units (I0 and I1), the processor in the table below also has a third integer execution unit (I2), a floating-point execution unit (F), and a branch execution unit (Br). In the table below, the leftmost column lists these units as result producers, and the top row lists consumers to which the results are sent. In this table, these result busses have been named arbitrarily starting with memory port 0 on result bus 'A' through the floating-point port on result bus 'F', similarly to as shown in FIG. 4. In this embodiment, certain macro instruction decomposition may be assumed for this configuration. Thus, in this example the result produced by memory unit 0 and by read port 1 may be provided over bus A to each of the functional units (and the scheduler). Similarly, the result produced by memory unit 1 and by read port 2 may be provided over bus C to each of the functional units (and the scheduler). Note that some of the functional units may not consume data from any of the producers (such as the branch unit) or may only consume data from a subset of the producers.

| | CONSUMERS | | | | | | |
|---|---|---|---|---|---|---|---|
| PRODUCERS | M0 | M1 | I0 | I1 | I2 | F | Br |
| M0 | A | A | A | A | A | A | A |
| M1 | B | B | B | B | B | B | B |
| I0 | C | C | C | C | C | | C |
| I1 | D | D | D | D | D | | D |
| I2 | E | E | E | E | E | | E |
| F | F | F | | | | F | |
| Br | | | | | | | |
| Read Port 0 | RB0 | RB0 | RB0 | RB0 | RB0 | RB0 | RB0 |
| Read Port 1 | A | A | A | A | A | A | A |
| Read Port 2 | RB1 | RB1 | RB1 | RB1 | RB1 | RB1 | RB1 |
| Read Port 3 | B | B | B | B | B | B | B |

The table above lists read port 0 through read port 3. Read ports 0 and 1 may share bank 0, and read ports 1 and 2 may share bank 1. In an embodiment, the underlined table entries denote CAM ports that were added to support this register file configuration. In the example processor described by this table, performance impact may be minimized by adding two full CAM ports to support two register file read ports, and by sharing the remaining two register file read ports with the memory result busses. This is shown in the table with read port 1 sharing the result bus A (memory port 0) and read port 3 sharing result bus B (memory port 1). Read ports 1 and 3 may be chosen such that an execution result bus is only needed on the less common case where two reads were simultaneously active on the same register bank. In other embodiments, and based on performance requirements, all, some or none of the busses may be overloaded.

In the example shown by the above table, the memory ports are overloaded, rather than the integer ports, because integer instructions may be more common and because the memory ports may have longer latency. In some embodiments, an execution unit that shares its result bus with the register file will signal the register file when a valid instruction will be producing a result. In such embodiments, the execution unit should have a latency long enough such that this notification can be delivered sufficiently early to stop a register read from being issued to the register file lookup and colliding with the execution result. If a register read is delayed, the operand may wait to be issued out of the register file unit read queues until, for example, the next clock cycle. If the latency is too short, a read request may get de-queued from the read queue and inserted into the register file lookup pipeline, which may result in a possible result bus collision. Because embodiments of the processor discussed above may tolerate variable latencies, issuing of register file reads may be delayed without throttling instructions being dispatched into the schedulers or being issued to the functional units.

In some embodiments, if the floating-point port does not reach enough ports (compared to read ports, which reach all execution ports) and if there may be floating-point benchmark performance concerns, the floating-point port may be overlooked when choosing a port to overload, such as the example shown by the above table. In some embodiments, the memory ports may be extended to reach the branch ports to support sharing with the register read ports.

The above is a detailed discussion of the certain embodiments. It is of course intended that the scope of the claims may cover other embodiments than those described above and their equivalents. For example, the instruction format and register designations discussed are merely for illustration, and any instruction format and/or registers may be used in other cases. Similarly, as another example, the processor may not use a read queue.

What is claimed is:

1. A processor comprising:
a scheduler to schedule instructions;
a register file unit comprising a plurality of registers; and
a dispatcher to dispatch to the scheduler a new instruction that specifies a source operand to be read from one of the plurality of registers, wherein if the register to be read from by the new instruction is also to be used by a previous instruction that is in-flight, then the dispatcher is to dispatch the new instruction without the generation of a request to read the source operand from the register for the new instruction.

2. The processor of claim 1, wherein if the register to be read from by the new instruction is also to be used by a previous instruction that is in-flight, then the scheduler is to receive the source operand for the new instruction as a result of the previous instruction.

3. The processor of claim 2, wherein the source operand for the new instruction is provided to the scheduler from a bypass network.

4. The processor of claim 1, wherein the processor further comprises a memory to store an array, wherein an entry in the array indicates for a register in the register file unit whether there is an instruction in-flight that is to use that register.

5. The processor of claim 4, further comprising a read queue to buffer requests to read data from a register in the register file unit.

6. The processor of claim 5, wherein the read queue comprises a plurality of banks of memory cells.

7. The processor of claim 1, wherein the plurality of registers in the register file unit are arranged as a plurality of banks.

8. The processor of claim 1, wherein the processor further comprises a write queue coupled to the register file unit to queue writes to the register file unit, and wherein the write queue comprises a plurality of banks.

9. The processor of claim 1, wherein the processor further comprises a functional unit having an output port coupled to an input port of the scheduler, and wherein an output port of a first register in the register file unit is coupled to the same input port of the scheduler as the functional unit.

10. The processor of claim 9, wherein the processor further comprises a shared bus that couples the output port of the functional unit with the input port of the scheduler, and wherein the shard bus also couples the output port of the first register with the input port of the scheduler.

11. A method comprising:
determining that a new instruction has a source operand to be read from a register;
determining whether an in-flight instruction is to use the same register as is to be read from by the new instruction; and
dispatching the new instruction into a scheduler without sending the register a request to read the source operand if an in-flight instruction is to use the same register as is to be read from by the new instruction.

12. The method of claim 11, wherein the method further comprises using the results of a read from the register by a prior instruction to provide the source operand to the scheduler for use by the new instruction.

13. The method of claim 11, wherein an in-flight instruction is considered to use the same register as is read from by the new instruction if the in-flight instruction reads from that same register or writes to that same register.

14. The method of claim 11, wherein determining whether an in-flight instruction is to use the same register as is read from by the new instruction comprises checking an array in a memory to determine whether any instructions in-flight are to be read from the same register as the new instruction or written to that same register.

15. The method of claim 11, wherein the method further comprises:
determining that there are no in-flight instructions that are to use the same register as is to be read from by the source instruction;
generating a request to read that same register; and
dispatching the new instruction into the scheduler prior to receiving the results of the generated request to read that same register.

16. The method of claim 15, wherein generating a request to read the register comprises sending to a read queue for that resister a request to read the source operand from the register.

17. The method of claim 11, wherein the method further comprises providing the source operand for the new instruction to an input port of the scheduler from either an output port of the register or from an output port of a functional unit, wherein the register and the functional unit share the scheduler input port.

* * * * *

UNITED STATES PATENT AND TRADEMARK OFFICE
CERTIFICATE OF CORRECTION

PATENT NO. : 7,395,415 B2  Page 1 of 1
APPLICATION NO. : 10/953760
DATED : July 1, 2008
INVENTOR(S) : Gary Hammond et al.

It is certified that error appears in the above-identified patent and that said Letters Patent is hereby corrected as shown below:

| Column | Line | |
|--------|------|---|
| 10 | 18 | Change "shard bus" to --shared bus--. |

Signed and Sealed this

Eighteenth Day of November, 2008

JON W. DUDAS
*Director of the United States Patent and Trademark Office*